(12) United States Patent
Nakatani

(10) Patent No.: US 6,820,845 B2
(45) Date of Patent: Nov. 23, 2004

(54) TRIPOD

(75) Inventor: Koichiro Nakatani, Tokyo (JP)

(73) Assignee: Nihon Velbon Seiki Kogyo Kabushiki Kaisha, Tokyo (JP)

(*) Notice: Subject to any disclaimer, the term of this patent is extended or adjusted under 35 U.S.C. 154(b) by 31 days.

(21) Appl. No.: 10/410,327

(22) Filed: Apr. 9, 2003

(65) Prior Publication Data

US 2003/0234327 A1 Dec. 25, 2003

(30) Foreign Application Priority Data

Jun. 21, 2002 (JP) ........................................ 2002-181983

(51) Int. Cl.[7] ............................................ F16M 11/02
(52) U.S. Cl. ................................................. 248/177.1
(58) Field of Search ................................ 248/168, 170, 248/166, 163.1

(56) References Cited

U.S. PATENT DOCUMENTS

| | | | | | |
|---|---|---|---|---|---|
| 4,317,552 | A | * | 3/1982 | Weidler | 248/168 |
| 4,905,946 | A | * | 3/1990 | Wang | 248/170 |
| 4,929,113 | A | * | 5/1990 | Sheu | 403/157 |
| 5,060,894 | A | * | 10/1991 | Hillinger | 248/170 |
| 5,082,222 | A | * | 1/1992 | Hsu | 248/170 |
| 5,213,296 | A | * | 5/1993 | Lee | 248/166 |
| 5,310,145 | A | * | 5/1994 | Chen | 248/170 |
| 5,458,305 | A | * | 10/1995 | Woodward | 248/121 |
| 5,823,491 | A | * | 10/1998 | Lindsay et al. | 248/169 |

FOREIGN PATENT DOCUMENTS

| JP | 08121687 A | * | 5/1996 | ........... F16M/11/34 |
|---|---|---|---|---|
| JP | 2000-018489 | | 1/2000 | |

OTHER PUBLICATIONS

Patent Abstracts of Japan for JP2000–018489 published on Jan. 18, 2000.

* cited by examiner

Primary Examiner—Leslie A. Braun
Assistant Examiner—A. Joseph Wujciak
(74) Attorney, Agent, or Firm—Darby & Darby

(57) ABSTRACT

To provide a tripod in which downsizing can be easily realized. A tripod comprises: a main tripod body; a camera supporting rod capable of rising and falling; rotatable legs; and operating bodies for adjusting the opening degree of the legs. These operating bodies are provided so as to be shiftable in the left and right direction without protruding upward from the upper surface of the main tripod body. These operating bodies each have an operating plate portion which shifts in the horizontal direction approximately along a plane including the upper surface of the main tripod body.

7 Claims, 12 Drawing Sheets

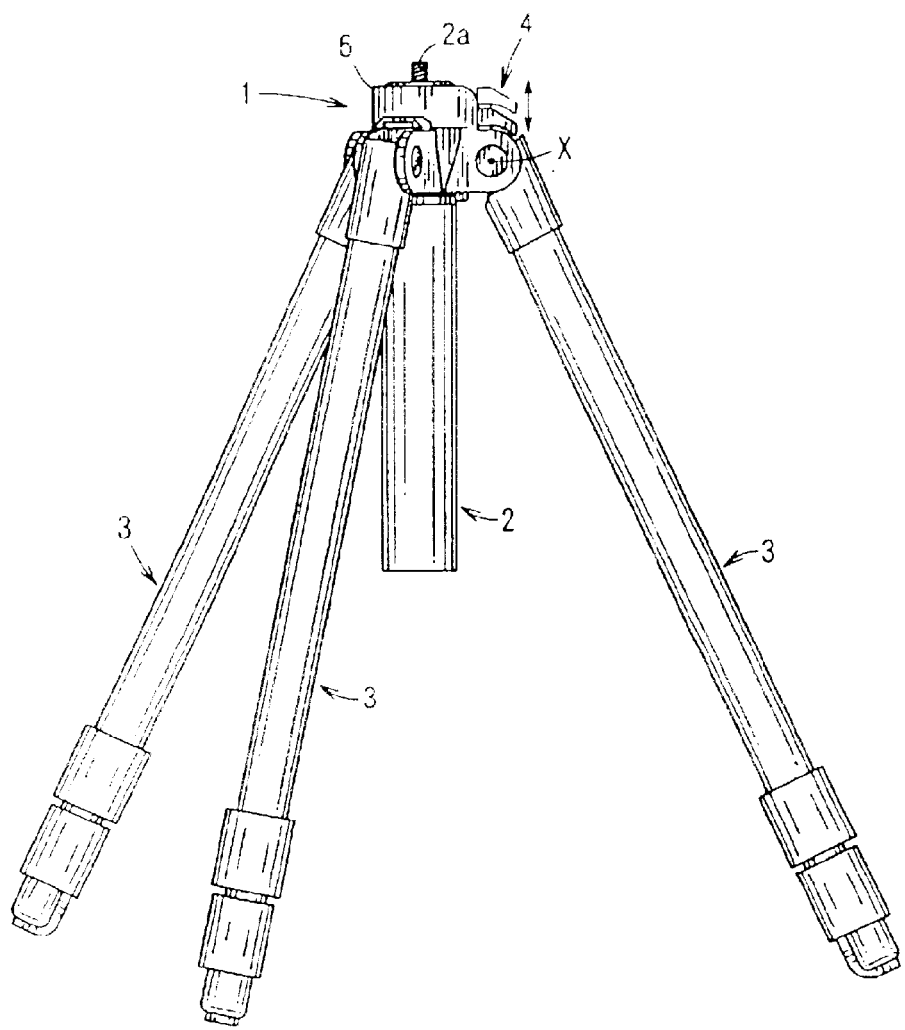
PRIOR ART  FIG. 22
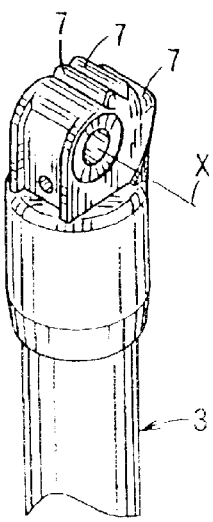
PRIOR ART  FIG. 23

TRIPOD

BACKGROUND OF THE INVENTION

The present invention relates to a tripod in which the opening degree of legs can be adjusted by an operation of the operating body.

Priorly, as a tripod of this type, for example, a tripod described in Japanese Unexamined Patent Publication No. 2000-18489 has been known.

This tripod comprises, as shown in FIG. 22, a main tripod body 1, and in the main tripod body 1, a camera supporting rod 2 having a screw portion 2a on its upper-end portion is provided so as to be capable of rising and falling. In addition, in the main tripod body 1, legs 3 whose lengths are adjustable are provided so as to be rotatable around a turning center axis line X in the horizontal direction. Furthermore, in the main tripod body 1, operating bodies 4 for adjusting the opening degree of the legs 3 are provided so as to be shiftable in the up-and-down direction.

In addition, on the upper portion of the main tripod body 1, an approximately cylindrical protrusion 6 of a size corresponding to the shifting amount of the operating bodies 4 is formed, and by this protrusion 6, a shifting space of the operating body 4 is secured at all times.

Herein, on the upper-end portion of the leg 3, as shown in FIG. 23, a plurality of, for example, three abutting surfaces 7 for an opening restriction which are different in the distance from the turning center axis line X are formed in a stepped manner. Then, an abutment between these abutting surfaces 7 for an opening restriction and a to-be-abutted surface of the operating body 4 results in a condition where the leg 3 is opened with a desirable opening degree.

However, in the prior-art tripod described in the above Japanese Unexamined Patent Publication No. 2000-18489, since it is necessary to form the protrusion 6 for securing the shifting space of the operating body 4 on the upper portion of the tripod body 1, there exists a problem such that downsizing is difficult.

OBJECTS AND SUMMARY OF THE INVENTION

In order to solve the above problem, an object of the present invention is to provide a tripod in which downsizing can be easily realized.

A tripod according to the present invention comprises:
a main tripod body; a camera supporting rod provided for the main tripod body so as to be capable of rising and falling; legs provided for the main tripod body so as to be rotatable around a turning center axis line in the horizontal direction; and operating bodies which are arranged so as to be shiftable in the horizontal direction without protruding upward from the main tripod body and are used for adjusting the opening degree of the legs.

Thus, different from the prior art, since it is unnecessary to form a protrusion for securing a shifting space of the operating bodies on the upper portion of the main tripod body, it becomes possible to easily realize downsizing.

A tripod according to the invention is constructed such that, in the tripod as set forth in claim 1, the operating body has an operating plate portion which shifts in the horizontal direction approximately along a plane including the upper surface of the main tripod body.

Thus, by operating the operating plate portion of the operating body, it becomes possible to easily adjust the opening degree of the leg.

A tripod according to the invention is constructed such that, a leg of the tripod has a plurality of abutting surfaces for an opening restriction which are the same in distance from the turning center axis line.

Thus, compared to a leg or the like having a plurality of abutting surfaces for an opening restriction which are different in distance from the turning center axis line, it becomes possible to appropriately secure sufficient strength.

A tripod according to the invention is constructed such that the operating body of the tripod returns to a reference position when the leg reaches a closed state.

Thus, since the operating body returns to the reference position when the leg reaches a closed state, a check of the position of the operating body is unnecessary, therefore, handle ability becomes excellent.

BRIEF DESCRIPTION OF THE DRAWINGS

FIG. 22 is a side view showing a conventional tripod.

FIG. 23 is a perspective view of an upper end portion of legs of a conventional tripod.

DETAILED DESCRIPTION OF THE INVENTION

Hereinafter, an embodiment of a tripod of the present invention will be described in detail with reference to the drawings.

Figure 1:
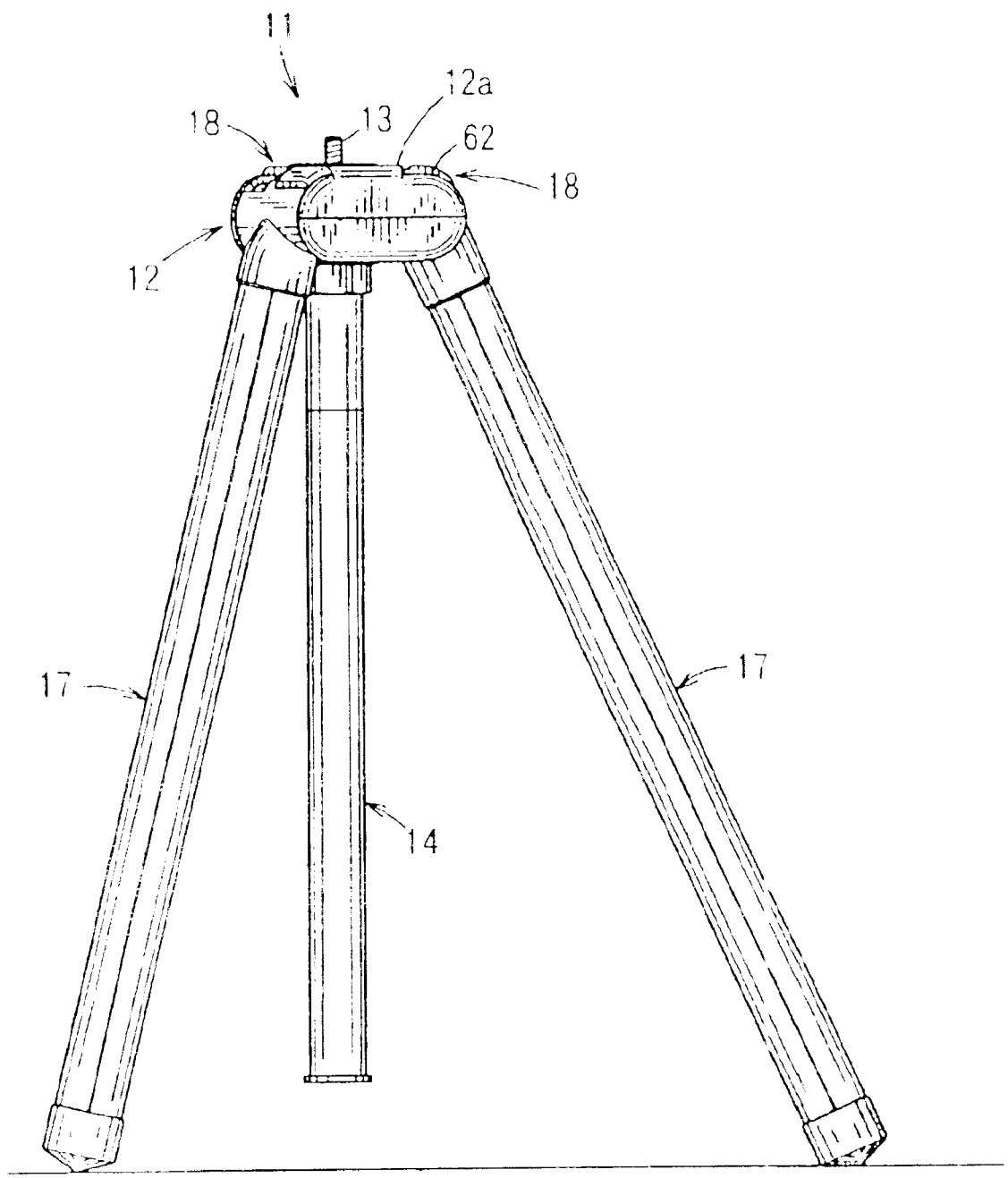
FIG. 1 is a side view showing an embodiment of the tripod of the present invention.
Figure 2:
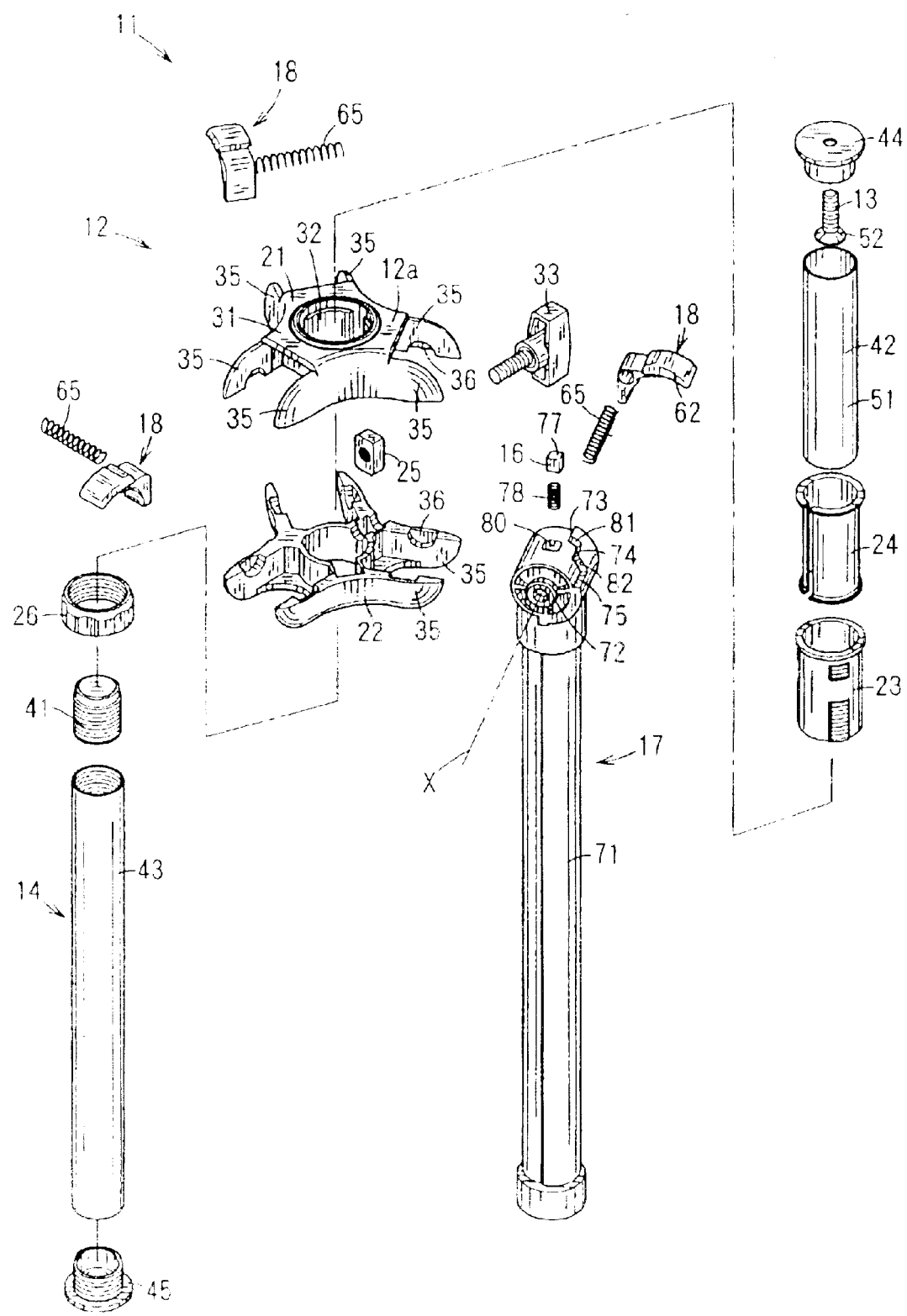
FIG. 2 is an exploded perspective view showing the same tripod as the above.
Figure 3:
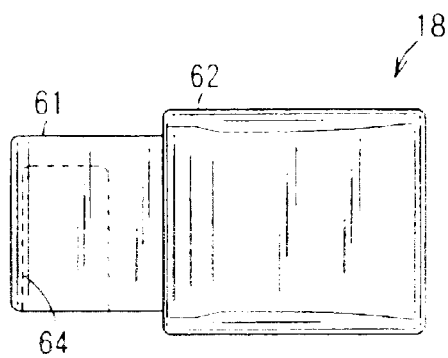
FIG. 3 is a plan view showing the operating body of the same tripod as the above.
Figure 4:
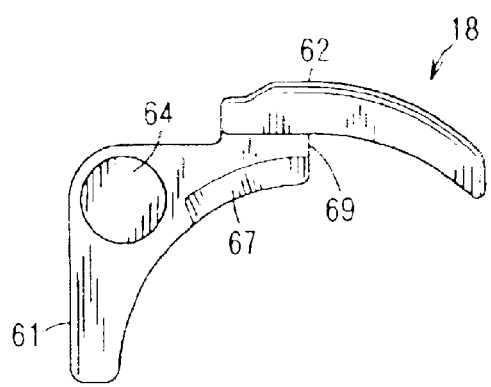
FIG. 4 is a side view showing the operating body of the same tripod as the above.
Figure 11:
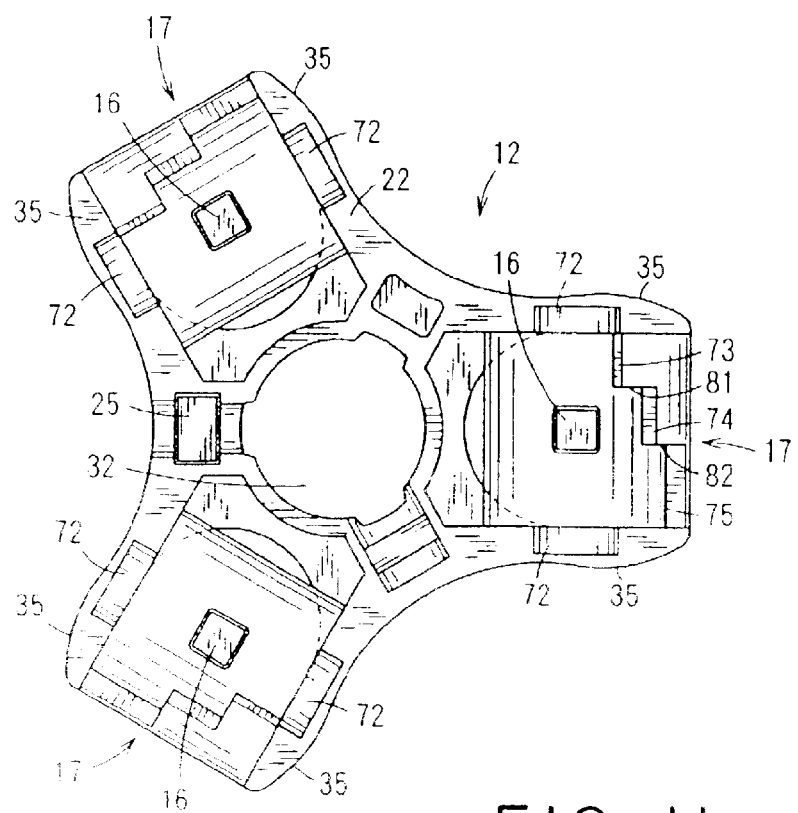
FIG. 11 is a plan view showing the lower member and legs of the same tripod as the above.
Figure 12:
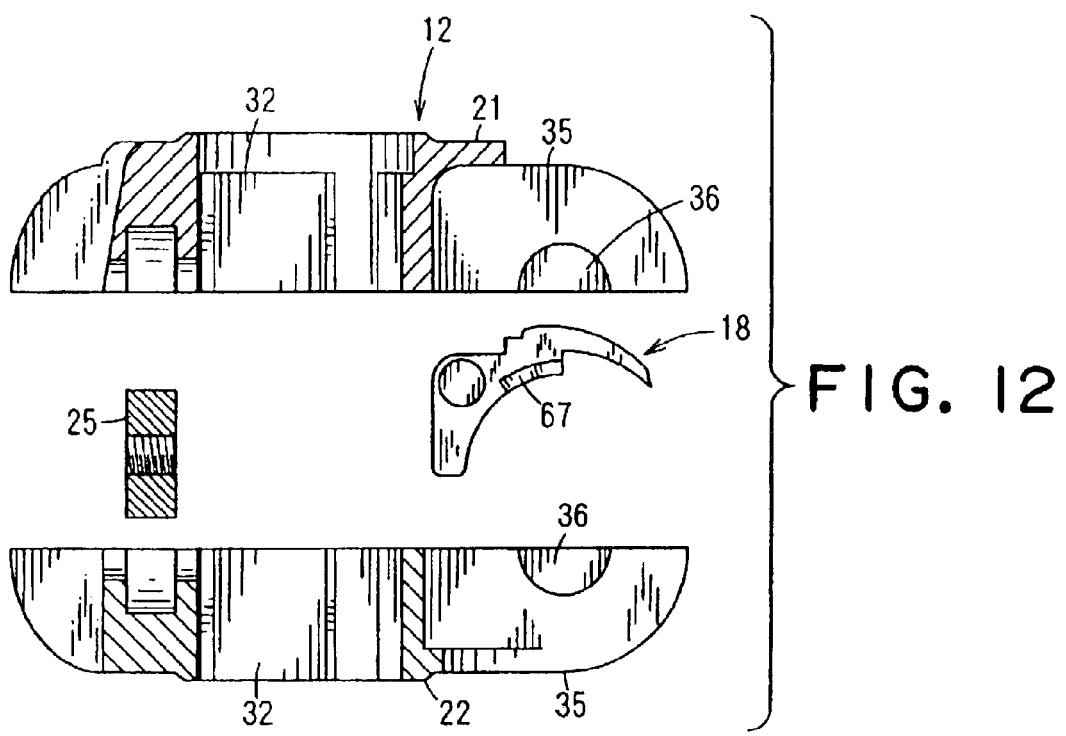
FIG. 12 is a plan view showing the upper member and lower member of the same tripod as the above.
Figure 13:
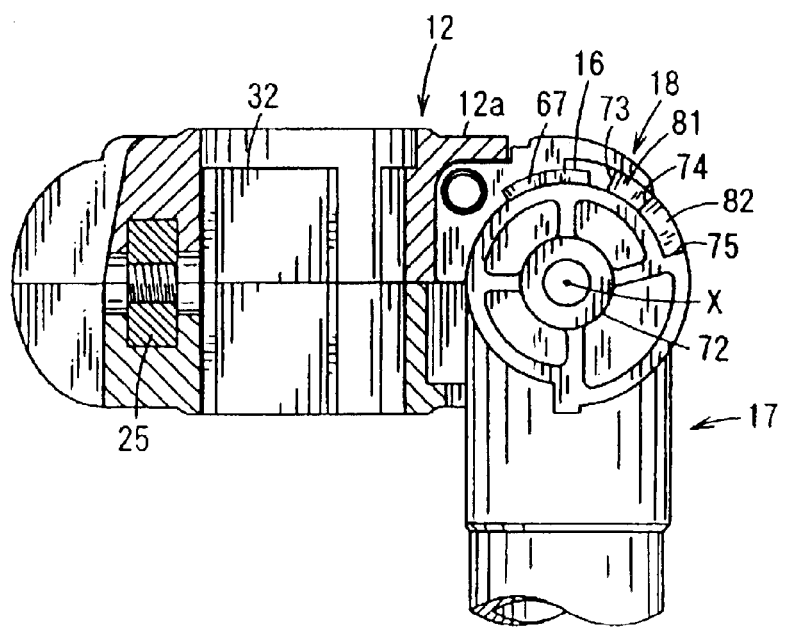
FIG. 13 is a sectional view showing the same tripod as the above in a closed state.

In FIG. 1 and FIG. 2, 11 denotes a tripod, and this tripod 11 comprises a main tripod body 12.

In this main tripod body 12, one camera supporting rod 14 which has a protruded screw portion 13 on its upper-end portion and whose length is adjustable is provided so as to be capable of rising and falling. In addition, in the main tripod body 12, provided are three legs 17 which respectively have a shift restricting portion 16 that can enter and exit from the upper-end portion and whose lengths are adjustable (extendable and retractable) so as to be rotatable around a turning center axis line X in the horizontal direction an the upper-end side of these legs 17.

Furthermore, an operating body 18 as a control lever to adjust the opening degree of the leg 17 is arranged, between the main tripod body 12 and leg 17, so as to be shiftable in the horizontal direction, for example, in the left and right direction without protruding upward from an approximately plane-like upper surface 12a of the main tripod body 12.

Herein, the main tripod body 12 has, as shown in FIG. 2, FIG. 8 through FIG. 13, etc., a main body portion 31 comprising, for example, an upper member 21, a lower member 22, an outer pipe member 23 with a thread groove, an inner pipe member 24 with a slot, a small member 25 with a screw hole, and a nut member 26.

At the center of this main body portion 31, an insertion hole 32 penetrating therethrough up and down is formed. Through this insertion hole 32, the camera supporting rod 14 is inserted so as to be capable of rising and falling, and this inserted camera supporting rod 14 is, by an operation of a fixing operation knob 33, fixed to the main body portion 31 so as to be releasable therefrom.

In addition, on the outer peripheral side of this main body portion 31, three paired vertical plane-like supporting plates 35 mutually distantly opposed are formed with intervals in the circumferential direction. On the inner surface side of these supporting plates 35, a concave bearing portion 36 is formed, and by this bearing portion 35, the upper-end side of the leg 17 is pivotally supported so as to be rotatable.

The camera supporting rod 14 is, for example, a divided center pole or the like, and has a top-and-bottom-blocked, approximately cylindrical main body portion 51 comprising, for example, an upper pipe member 42 and a lower pipe member 43 connected via a connecting member 41, an upper cap 44 for blocking up the top opening of the upper pipe member 42, and a lower cap 45 for blocking up the bottom opening of the lower pipe member 43.

To this upper cap 44 of the main body portion 51, a screw 52 is securely fitted, and this screw 52 composes a screw portion 13. This screw portion 13 is protruded upward from the top of the main body portion 51.

The operating body 18 is, for example, formed of metal to have an appointed shape as one body and comprises, as shown in FIG. 3 through FIG. 7, etc., for example, a base portion 61 which shifts in the left and right direction between the supporting plates 35 of the main body portion 31 of the main tripod body 12 and an operating plate portion 62 which is provided on the upper portion of this base portion 61 as one body and shifts, in an externally exposed manner above the section between the supporting plates 35, in the left and right direction approximately along a plane including the upper surface 12a of the main tripod body 12.

This base portion 61 is formed to have a dogleg shape when viewed from the side, and in this base portion 61, a screw inserting hole 64 is formed to have a concave shape opening toward the left side as one side. Then, into this screw inserting hole 64, one end side of an approximately cylindrical first spring 65 as an urging body to urge the operating body 18 toward the right side as the other side is inserted. Herein, by an urging of this first spring 65, the operating body 18 is automatically returned to a reference position (a right-side position) when the leg 17 reaches a closed state.

Figure 5:
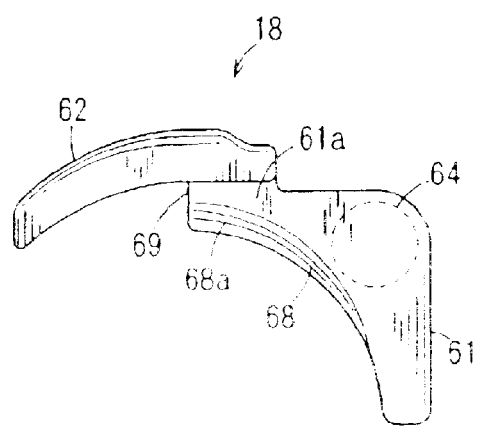
FIG. 5 is a side view showing the operating body of the same tripod as the above.
Figure 6:
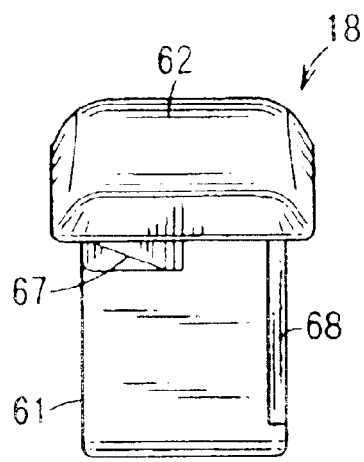
FIG. 6 is a front view showing the operating body of the same tripod as the above.
Figure 7:
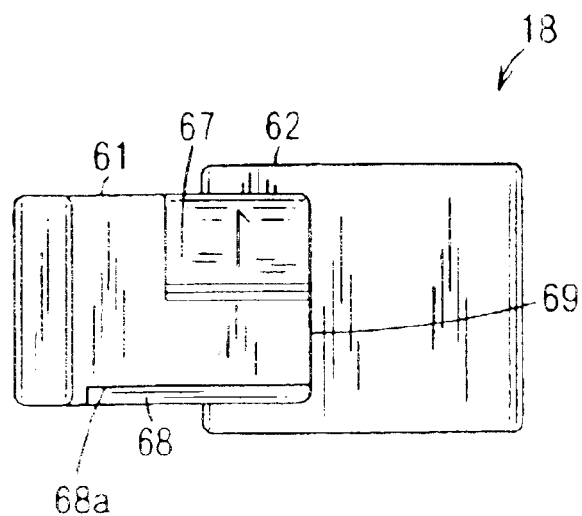
FIG. 7 is a bottom plan view showing the operating body of the same tripod as the above.
Figure 8:
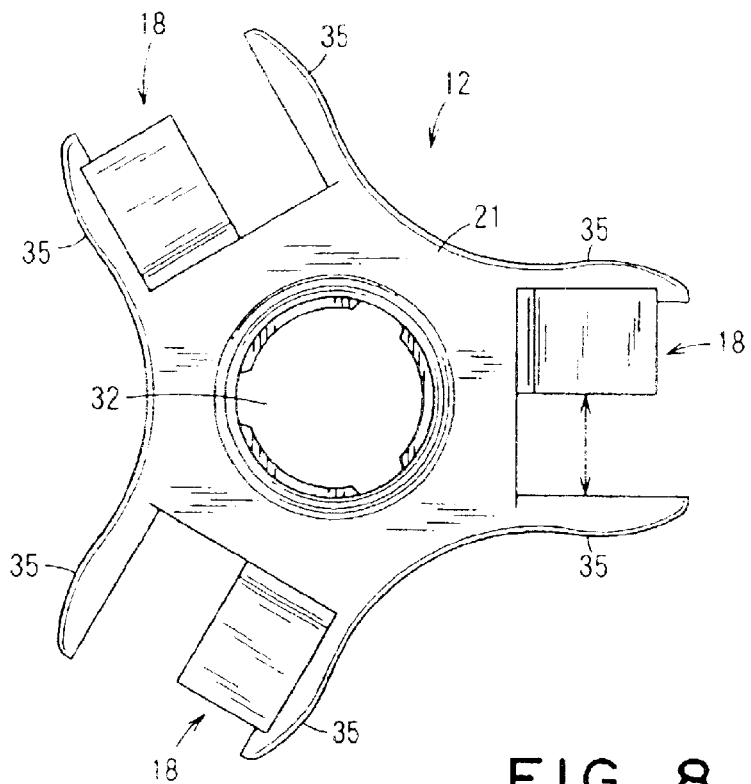
FIG. 8 is a plan view showing the upper member of the same tripod as the above.
Figure 9:
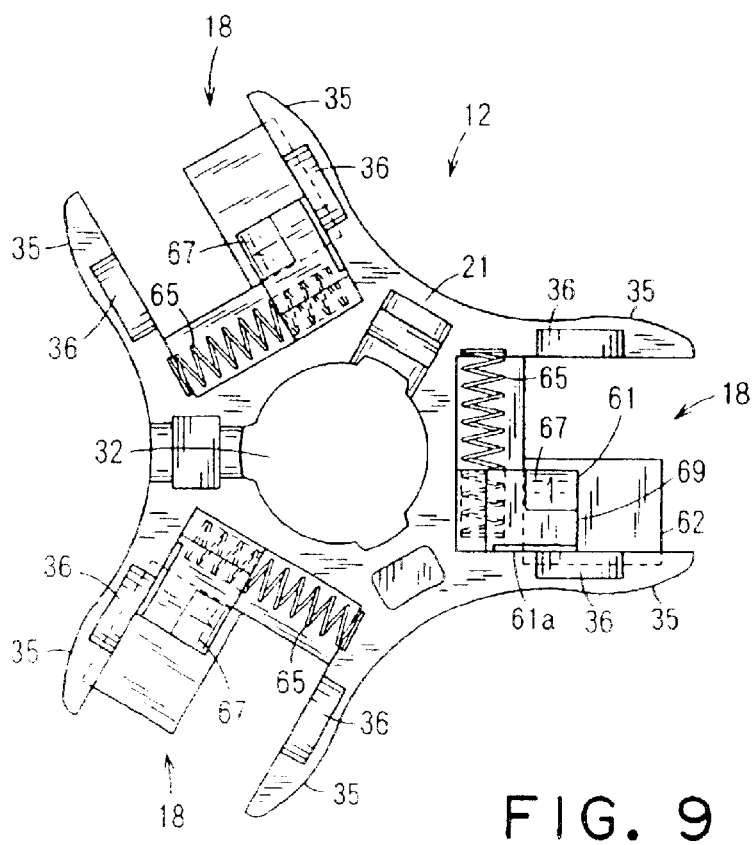
FIG. 9 is a bottom plan view showing the upper member of the same tripod as the above.
Figure 10:
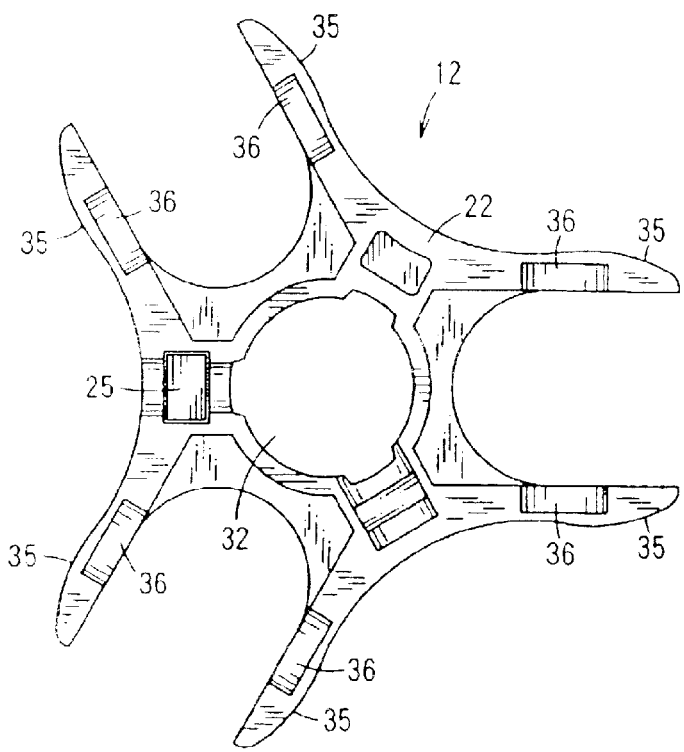
FIG. 10 is a plan view showing the lower member of the same tripod as the above.

In addition, a surface of this base portion 61 on the side opposed to the leg 17 is formed to have an approximately arc surface. And, at a part of the upper portion on the left side when viewed from the front in this approximately arc surface-like surface of the base portion 61, formed is an inclined surface 67 which is gradually inclined upward from its approximately center toward the left end side. In addition, at an edge part on the right side when viewed from the front in this approximately arc surface-like surface of the base portion 61, an approximately arc-like cutaway stepped portion 68 is formed across nearly the whole of this edge part. The step of this cutaway stepped portion 68 becomes, as shown in FIG. 5, gradually small from the upper-end side toward the lower-end side. Herein, a surface continuing upward from the upper end of this approximately arc surface-like surface of the base portion 61 composes a vertical plane-like to-be-abutted surface 69.

In addition, the operating plate 62 is formed to have an approximately rectangular plate-like shape whose front-end side is slightly curved downward. The base-end portion of this operating plate portion 62 is connected to the upside edge portion of the base portion 61 as one body.

The leg 17 has a multistage main leg portion 71 comprising, for example, a plurality of pipes, etc.

The upper-end portion of this main leg portion 71 is formed to have an approximately cylindrical shape whose axial direction coincides with the turning center axis line X. And, from both end faces of an approximately cylindrical upper-end portion of this main leg portion 71, an axis portion 72 as a convex trunnion shaft which is fitted to the bearing portion 36 and is pivotally supported thereby is laterally protruded.

In addition, on the outer peripheral side of the approximately cylindrical upper-end portion of this main leg portion 71, a plurality of abutting surfaces for an opening restriction which are the same in distance from the turning center axis line X, namely, for example, a first abutting surface 73 for an opening restriction, a second abutting surface 74 for an opening restriction, a third abutting surface 75 for an opening restriction are respectively formed.

Namely, on the outer peripheral side of the upper-end portion of this main leg portion 71, in order from the top, the first abutting surface 73 for an opening restriction, the second abutting surface 74 for an opening restriction, and the third abutting surface 75 for an opening restriction are respectively formed along the turning center axis line X. Herein, the first abutting surface 73 for an opening restriction and the second abutting surface 74 for an opening restriction are communicated by a first communicating surface 81 facing to the left side. In addition, the second abutting surface 74 for an opening restriction and the third abutting surface 75 for an opening restriction are communicated by a second communicating surface 82 facing to the left side.

Figure 14:
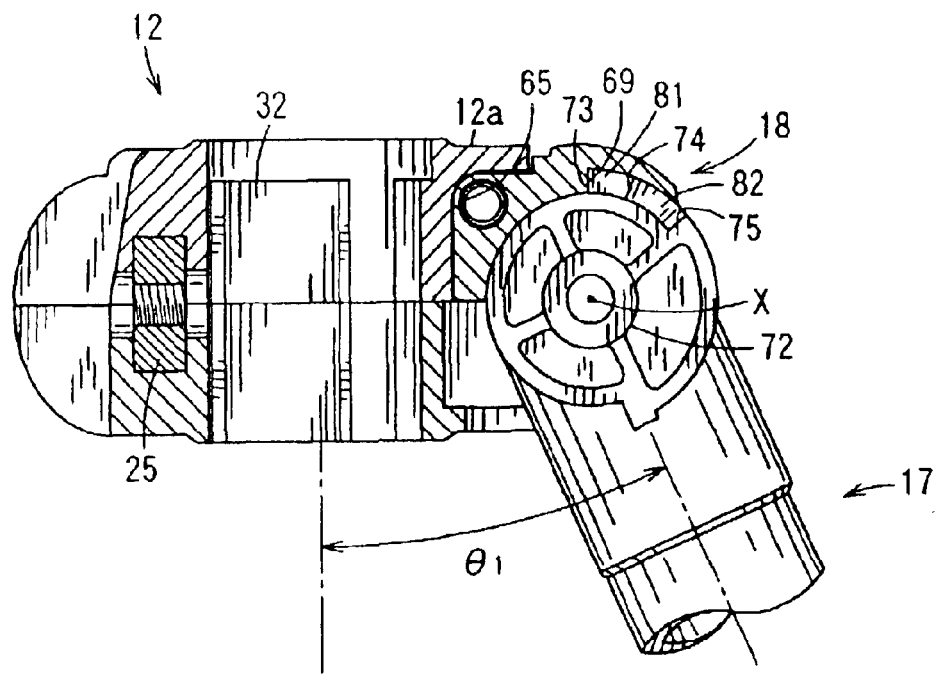
FIG. 14 is a sectional view showing the same tripod as the above in a normally opened state.

As shown in FIG. 14, by an abutment of the first abutting surface 73 for an opening restriction against the to-be-abutted surface 69 of the operating body 18, a turn (opening) of the leg 17 in the opening direction is restricted, thus the leg 17 reaches a normally opened state where the same is opened with a normal opening degree θ1 (for example, approximately 25 degrees).

Figure 15:
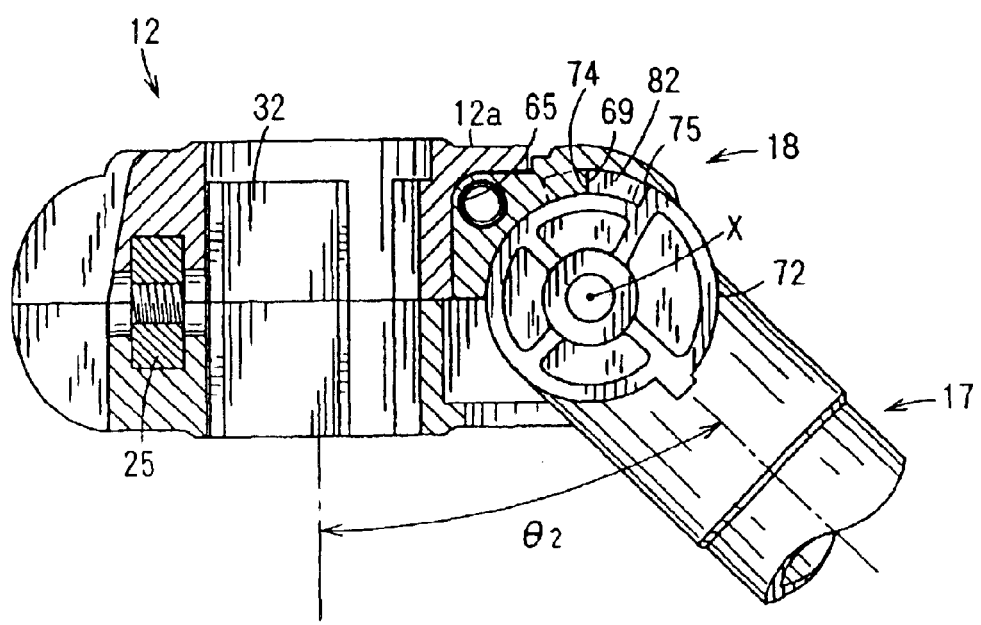
FIG. 15 is a sectional view showing the same tripod as the above in a semi-low-angle-opened state.

In addition, as shown in FIG. 15, by an abutment of the second abutting surface 74 for an opening restriction of the leg 17 against the to-be-abutted surface 69, a turn (opening) of the leg 17 in the opening direction is restricted, thus the leg 17 reaches a semi-low-angle-opened state where the same is opened with a semi-low-angle-opening degree θ2 (for example, approximately 45 degrees).

Figure 16:
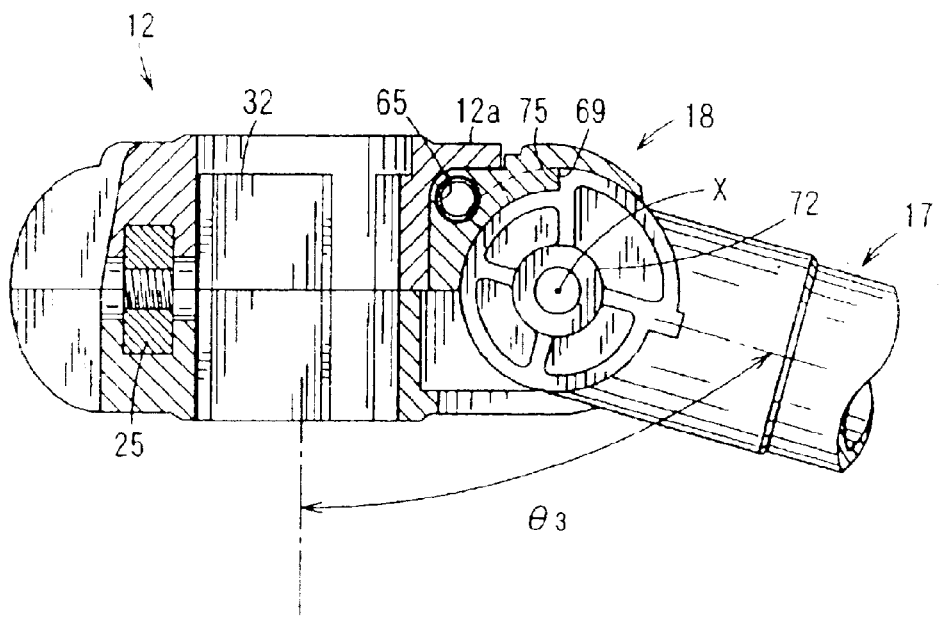
FIG. 16 is a sectional view showing the same tripod as the above in a low-angle-opened state.

In addition, as shown in FIG. 16, by an abutment of the third abutting surface 75 for an opening restriction of the leg 17 against the to-be-abutted surface 69, a turn (opening) of the leg 17 in the opening direction is restricted, thus the leg 17 reaches a low-angle-opened state where the same is opened with a low-angle-opening degree θ3 (for example, approximately 75 degrees).

On the other hand, on the upper-end portion of the main leg portion 71 of the leg 17, an approximately block-like shift restricting member 77 for restricting a shift of the operating body 18 to the right side is provided so as to be capable of entering and exiting from the main leg portion 71. Namely, the shift restricting member 77 is arranged in a hole portion 80 formed on the upper-end portion of the main leg portion 71 so as to be freely movable up and down. Then, this shift restricting member 77 is urged upward by an approximately cylindrical second spring 78 as an urging body. Herein, this shift restricting member 77 comprises a shift restricting portion 16 for restricting a shift of the operating body 18 to the right side.

Now, a method for using the tripod 11 of the above embodiment will be described with reference to the drawings.

Figure 17:
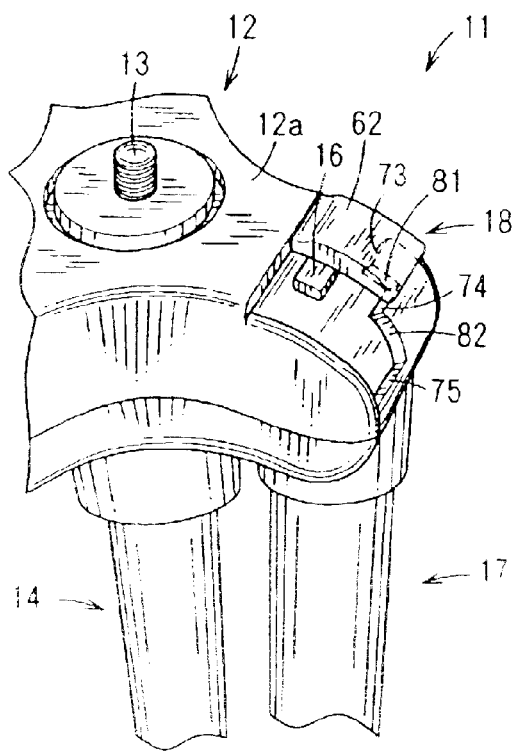
FIG. 17 is a partially cut-away perspective view showing the same tripod as the above.

In a case where the tripod 11 is used in a normally opened state, as shown in FIG. 17, in a condition where the operating body 18 is located at a reference position (a right-side position) by an urging of the first spring portion 65 and a right-side surface 61a of the base portion 61 of this operating body 18 is abutted against the inner surface of the right supporting plate, the leg 17 in a closed state is turned, that is, opened in the opening direction around the turning center axis line X.

Figure 18:
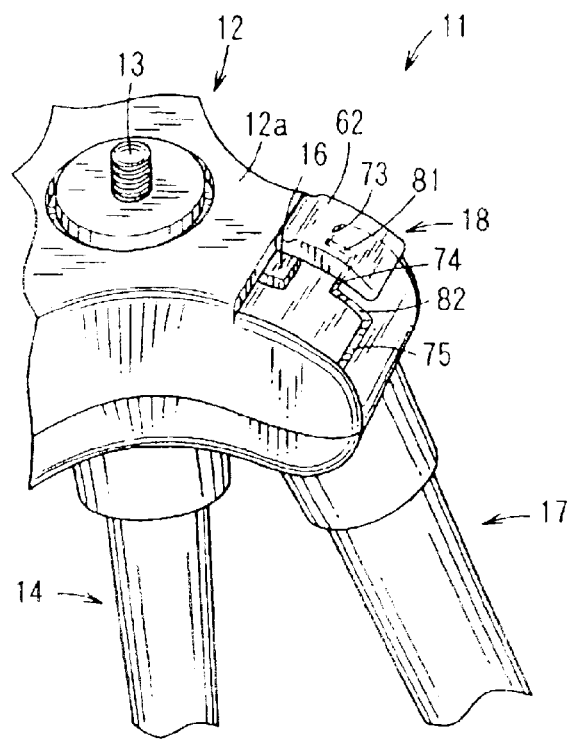
FIG. 18 is a partially cut-away perspective view showing the same tripod as the above.

Thereby, as shown in FIG. 18, the first abutting surface 73 for an opening restriction of the leg 17 butts against the to-be-abutted surface 69 of the operating body 18, and by this abutment between the first abutting surface 73 for an opening restriction and to-be-abutted surface 69, a turn of the leg 17 in the opening direction is restricted, and as a result, the leg 17 reaches a normally opened state where the same is opened with the normal opening degree θ1.

To the screw portion 13 of the camera supporting rod 14, a camera is attached via a camera platform or a camera is directly attached for carrying out photography. In addition, after photography, if the leg 17 is turned in the closing direction around the turning center axis line X, the leg 17 reaches its original closing state as shown in FIG. 17.

Figure 19:
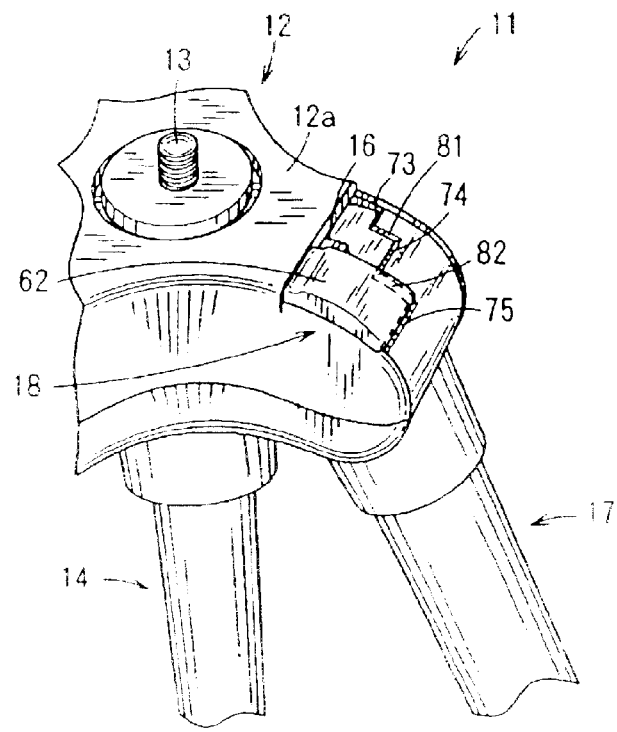
FIG. 19 is a partially cut-away perspective view showing the same tripod as the above.
Figure 20:
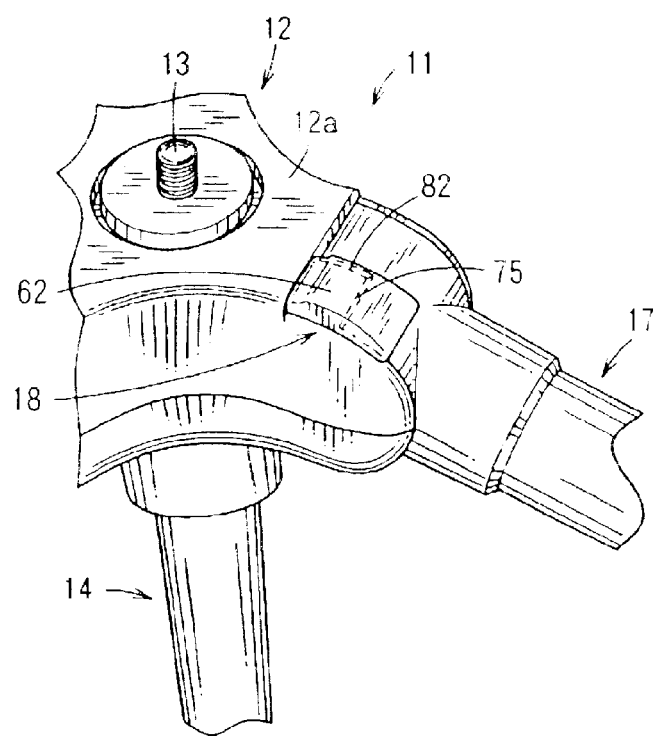
FIG. 20 is a partially cut-away perspective view showing the same tripod as the above.

In addition, in a case where the tripod 11 is used in a low-angle-opened state, first, as shown in FIG. 19, the operating body 18 is shifted in the left direction until the same comes to a click stop. Namely, by operating the operating plate portion 62 of the operating body 18, the operating body 18 is shifted in the left direction while resisting an urging of the first spring 65 and is located at a position for a low angle (a left-side position).

At this time of a shift of the operating body 18, the shift restricting portion 16 of the leg 17 enters inside the hole portion 80 by being pushed downward by the inclined surface 67 of the operating body 18 and then exits, after passing of the operating body 18, from the inside of the hole portion 80 by an urging of the second spring 78 and returns to the original protruded state. Then, this shift restricting portion 16 in a protruded state butts against the side surface 68a of the cutaway stepped portion 68 of the base portion 61 of the operating body 18, whereby a shift of the operating body 18 to the right side based on the urging by the first spring 65 is restricted, thus the operating body 18 is positioned and fixed to the position for a low angle.

Next, in a condition where this operating body 18 is located at a position for a low angle, when the leg 17 is turned in the opening direction around the turning center axis line X, the third abutting surface 75 for an opening restriction butts against the to-be-abutted surface 69 of the operating body 18, and by this abutment between the third abutting surface 75 for an opening restriction and to-be-abutted surface 69, a turn of the leg 17 in the opening direction is restricted, and as a result, the leg 17 reaches a low-angle-opened state where the same is opened with the low-angle-opening degree θ3.

In the middle of this turn of the leg 17 in the opening direction, the abutment between the shift restricting portion 16 in a protruded state and a side surface 68a of the cutaway stepped portion 68 of the base portion 61 of the operating body 18 is released by separation of the shift restricting portion 16 from the side surface 68a. After the abutment between the shift restricting portion 16 and side surface 68a is released, a shift of the operating body 18 to the right side based on an urging by the first spring 65 is restricted by an abutment between the right-side surface 61a of the base portion 61 of the operating body 18 and the second communicating surface 82. Therefore, the operating body 18 is maintained in a condition where the same is located at the position for a low angle.

Herein, to the screw portion 13 of the camera-supporting rod 14, a camera is attached via a camera platform or a camera is directly attached for carrying out photography. In addition, after photography, if the leg 17 is turned in the closing direction around the turning center axis line X, the leg 17 reaches its original closing state as shown in FIG. 17. At this time of a turn of the leg 17 in the closing direction, the operating body 18 shifts in the right direction by an urging of the first spring 65 and returns to a reference position (a right-side position) as a normal position.

Furthermore, in a case where the tripod 11 is used in a semi-low-angle-opened state, it is necessary to once bring the leg 17 into a low-angle-opened state.

Namely, in a case where the tripod 11 is used in a semi-low-angle-opened state, after the leg 17 is brought into a low-angle-opened state in the aforementioned manner, the leg 17 is slowly turned in the closing direction around the turning center axis line X, and this turn in the closing direction is stopped at a stage where the operating body 18 is positioned at a position for a semi-low angle (the middle position).

That is, the leg 17 is turned in the closing direction until a shift of the operating body 18 to the right side based on an urging by the first spring 65 of the operating body 18 is restricted by an abutment between the right-side surface 61a of the base portion 61 of the operating body 18 and the first communicating surface 81.

Figure 21:
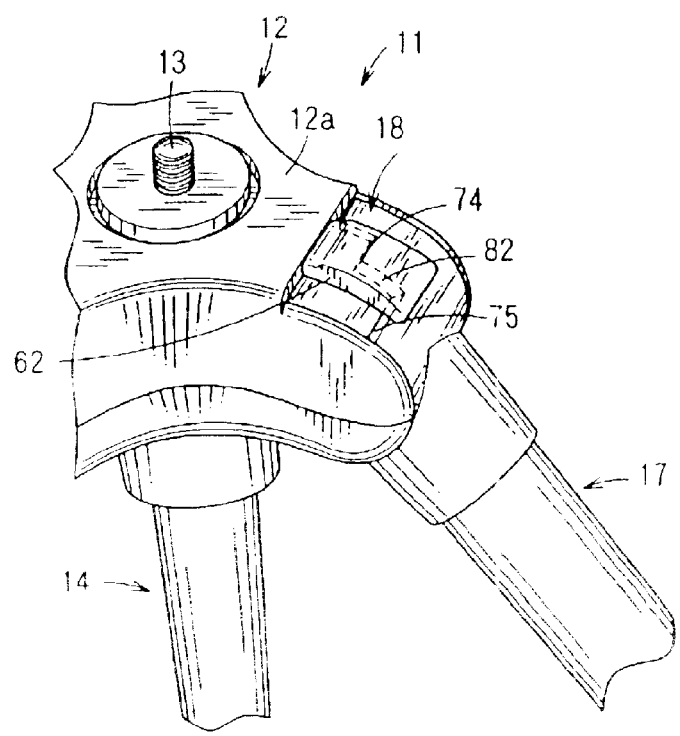
FIG. 21 is a partially cut-away perspective view showing the same tripod as the above.

Then, in the condition where this operating body 18 is positioned at the position for a semi-low angle, when the leg 17 is turned around the turning center axis line X so as to slightly return to the opening direction, as shown in FIG. 21, the second abutting surface 74 for an opening restriction of the leg 17 butts against the to-be-abutted surface 69 of the operating body 18, and by this abutment between the second abutting surface 74 for an opening restriction and the to-be-abutted surface 69, a turn of the leg 17 in the opening direction is restricted, and as a result, the leg 17 reaches a semi-low-angle-opened state where the same is opened with the semi-low-angle-opening degree θ3.

Herein, to the screw portion 13 of the camera-supporting rod 14, a camera is attached via a camera platform or a camera is directly attached for carrying out photography. In addition, after photography, if the leg 17 is turned in the closing direction around the turning center axis line X, the leg 17 reaches its original closed state as shown in FIG. 17. At this time of a turn of the leg 17 in the closing direction, the operating body 18 shifts in the right direction by an urging of the first spring 65 and returns to a reference position (a right-side position) as a normal position.

According to the tripod 11 of the above embodiment, since the operating body 18 for adjusting the opening degree of the leg 17 is provided for the main tripod body 12 so as to be shiftable in the left and right direction without its protruding upward from the upper surface 12a, not only can the number of components be reduced, but also it is unnecessary to form a protrusion, etc., for securing a shifting space of the operating body 18 on the upper portion of the main tripod body 12, therefore, downsizing can be easily realized. Accordingly, compared to the prior-art tripod, the size in the up-and-down direction of the main tripod body 12 can be reduced, whereby the contracting ratio of the whole tripod 11 can be improved.

In addition, compared to the legs or the like having a plurality of abutting surfaces for an opening restriction which are different in the distance from the turning center axis line X of the leg 17, sufficient strength of the abutting surfaces 73, 74, and 75 for an opening restriction can be properly secured, and accordingly, durability can be improved compared to the prior-art tripod.

Furthermore, since the operating body 18 is constructed as to always return to the reference position by an urging of the first spring 65 when the leg 17 reaches a closed state, a check of the position of the operating body 18 in previous use can be made unnecessary, therefore, excellent handle ability can be attained.

Herein, the tripod 11 is not limited to a tripod wherein the opening degree of the legs 17 can be adjusted at three levels, and, for example, although not illustrated, a tripod wherein the opening degree can be adjusted at two levels, four levels, and five levels, etc., or without levels may be employed.

In addition, the operating body 18 is not limited to an operating body which is shiftable in the left and right direction, and, for example, although not illustrated, an operating body which is shiftable in the horizontal direction other than the left and right direction, for example, in the back and forth direction may be employed.

According to the embodiment of the invention, different from the prior art, since it is unnecessary to form a protrusion for securing a shifting space of the operating body on the upper portion of the main tripod body, downsizing can be easily realized.

According to the embodiment of the invention, by operating the operating plate portion of the operating body, the opening degree of the leg can be easily adjusted.

According to the embodiment of the invention, compared to the leg or the like having a plurality of abutting surfaces for an opening restriction which are different in the distance from the turning center axis line, sufficient strength can be properly secured.

According to the embodiment of the invention, since the operating body returns to the reference position when the leg reaches a closed state, a check of the operating body's position can be made unnecessary, therefore, excellent handle ability can be attained.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A tripod comprising:
   a main tripod body,
   a camera supporting rod provided for said main tripod body so as to be capable of rising and falling,
   legs provided for said main tripod body so as to be rotatable around a turning center axis line in the horizontal direction,
   operating bodies which are arranged so as to be shiftable in the horizontal direction without protruding upward from said main tripod body and are used for adjusting the opening degree of said legs;
   wherein a horizontal shift of an operating body in a first direction results in a closed state of the tripod, while a horizontal shift of the operating body in a second direction results in an opened state of the tripod, and
   the operating body has an operating plate portion which shifts in the horizontal direction approximately along a plane including an upper surface of the main tripod body.

2. A tripod as set forth in claim 1, wherein the leg has a plurality of abutting surfaces for an opening restriction which are the same in distance from the turning center axis line.

3. A tripod as set forth in claim 1, wherein the operating body returns to a reference position when the leg reaches a closed state.

4. A tripod as set forth in claim 1, wherein the leg has a plurality of abutting surfaces for an opening restriction which are the same in distance from the turning center axis line.

5. A tripod as set forth in claim 1, wherein the operating body returns to a reference position when the leg reaches a closed state.

6. A tripod as set forth in claim 2, wherein the operating body returns to a reference position when the leg reaches a closed state.

7. A tripod as set forth in claim 1, wherein the first direction opposes the second direction.

* * * * *